(12) United States Patent
Dorner et al.

(10) Patent No.: US 7,146,616 B2
(45) Date of Patent: Dec. 5, 2006

(54) CONTENT BASED MESSAGING FOR E-LEARNING INCLUDING THE EXTENSION OF A REMOTE PROCEDURE CALL

(75) Inventors: Elmar Dorner, Karlsruhe (DE); Markus Grossmann, Vaihingen (DE)

(73) Assignee: SAP Aktiengesellschaft, Waldorf (DE)

( * ) Notice: Subject to any disclaimer, the term of this patent is extended or adjusted under 35 U.S.C. 154(b) by 591 days.

(21) Appl. No.: 10/232,809

(22) Filed: Sep. 3, 2002

(65) Prior Publication Data
US 2004/0045017 A1 Mar. 4, 2004

(51) Int. Cl.
*G06F 3/00* (2006.01)
*G06F 13/00* (2006.01)

(52) U.S. Cl. .................. 719/318; 719/330

(58) Field of Classification Search ............. 719/330, 719/318
See application file for complete search history.

(56) References Cited

U.S. PATENT DOCUMENTS

| | | |
|---|---|---|
| 5,008,853 A | 4/1991 | Bly et al. |
| 5,151,684 A | 9/1992 | Johnsen |
| 5,310,349 A | 5/1994 | Daniels et al. |
| 5,395,243 A | 3/1995 | Lubin et al. |
| 5,584,699 A | 12/1996 | Silver |
| 5,619,555 A | 4/1997 | Fenton et al. |
| 5,675,802 A | 10/1997 | Allen et al. |
| 5,692,125 A | 11/1997 | Schloss et al. |
| 5,727,950 A | 3/1998 | Cook et al. |
| 5,739,512 A | 4/1998 | Tognazzini |
| 5,788,508 A | 8/1998 | Lee et al. |
| 5,802,514 A | 9/1998 | Huber |
| 5,881,315 A | 3/1999 | Cohen |
| 5,918,211 A | 6/1999 | Sloane |
| 5,923,737 A | 7/1999 | Weishut et al. |
| 6,011,949 A | 1/2000 | Shimomukai |
| 6,014,134 A | 1/2000 | Bell et al. |
| 6,029,043 A | 2/2000 | Ho et al. |

(Continued)

FOREIGN PATENT DOCUMENTS

EP 0 967 558 A 12/1999

(Continued)

OTHER PUBLICATIONS

Fitzpatrick, Geraldine, et al., 'Augmenting the Workaday World with Elvin' [online]. *Proceedings of ECSCW'99*, Sep. 1999, Kluwer Academy Publishers, Copenhagen, Denmark, pp. 431-451 [retrieved on Jan. 26, 2005]. Retrieved from the Internet: <URL: http://dstc.com/Research/Projects/EWP/Papers/ecscw99-dist.pdf>.

(Continued)

*Primary Examiner*—William Thomson
*Assistant Examiner*—Qing-Yuan Wu
(74) *Attorney, Agent, or Firm*—Fish & Richardson P.C.

(57) ABSTRACT

A content based messaging-remote procedure call (CBM-RPC) protocol is provided as an extension of a CBM system that allows an application to directly access a remote procedure and, for example, obtain data returned by the procedure (e.g., stored in an associated database or storage device). An application may specify a procedure name (e.g., a unique identification (ID), such as a uniform resource identification (URI)) and parameters (e.g., a list of name/value-pairs) in a request (or a CBM-RPC), which is published to a CBM network. One or more, procedures or functions may subscribe to the request and generate responses (e.g., the requested information or a fault if the request is not valid) that are published to the CBM network.

36 Claims, 5 Drawing Sheets

U.S. PATENT DOCUMENTS

| | | | |
|---|---|---|---|
| 6,091,930 | A | 7/2000 | Mortimer et al. |
| 6,099,320 | A | 8/2000 | Papadopoulous |
| 6,112,049 | A | 8/2000 | Sonnenfeld |
| 6,134,552 | A | 10/2000 | Fritz et al. |
| 6,148,338 | A | 11/2000 | Lachelt et al. |
| 6,149,438 | A | 11/2000 | Richard et al. |
| 6,149,441 | A | 11/2000 | Pellegrino et al. |
| 6,162,060 | A | 12/2000 | Richard et al. |
| 6,164,974 | A | 12/2000 | Carlile et al. |
| 6,175,841 | B1 | 1/2001 | Loiacono |
| 6,179,206 | B1 | 1/2001 | Matsumori |
| 6,182,143 | B1 | 1/2001 | Hastings et al. |
| 6,185,542 | B1 | 2/2001 | Moran et al. |
| 6,315,572 | B1 | 11/2001 | Owens et al. |
| 6,327,576 | B1 | 12/2001 | Ogasawara |
| 6,336,813 | B1 | 1/2002 | Siefert |
| 6,347,333 | B1 | 2/2002 | Eisendrath et al. |
| 6,347,943 | B1 | 2/2002 | Fields et al. |
| 6,368,110 | B1 | 4/2002 | Koenecke et al. |
| 6,370,355 | B1 | 4/2002 | Ceretta et al. |
| 6,381,444 | B1 | 4/2002 | Aggarwal et al. |
| 6,397,036 | B1 | 5/2002 | Thean et al. |
| 6,398,556 | B1 | 6/2002 | Ho et al. |
| 6,430,563 | B1 | 8/2002 | Fritz et al. |
| 6,470,171 | B1 | 10/2002 | Helmick et al. |
| 6,471,521 | B1 | 10/2002 | Dornbush et al. |
| 6,491,217 | B1 | 12/2002 | Catan |
| 6,514,085 | B1 | 2/2003 | Slattery et al. |
| 6,527,556 | B1 | 3/2003 | Koskinen |
| 6,587,668 | B1 | 7/2003 | Miller et al. |
| 6,587,835 | B1 | 7/2003 | Treyz et al. |
| 6,606,480 | B1 | 8/2003 | L'Allier et al. |
| 6,622,003 | B1 | 9/2003 | Denious et al. |
| 6,633,742 | B1 | 10/2003 | Turner et al. |
| 6,643,493 | B1 | 11/2003 | Kilgore |
| RE38,432 | E | 2/2004 | Fai et al. |
| 6,701,125 | B1 | 3/2004 | Lohse |
| 6,709,330 | B1 | 3/2004 | Klein et al. |
| 6,729,885 | B1 | 5/2004 | Stuppy et al. |
| 6,801,751 | B1 | 10/2004 | Wood et al. |
| 6,873,715 | B1 | 3/2005 | Kuo et al. |
| 6,907,011 | B1 * | 6/2005 | Miller et al. ............... 370/254 |
| 2001/0044728 | A1 | 11/2001 | Freeman et al. |
| 2001/0047310 | A1 | 11/2001 | Russell |
| 2002/0006603 | A1 | 1/2002 | Peterson et al. |
| 2002/0042041 | A1 | 4/2002 | Owens et al. |
| 2002/0061506 | A1 | 5/2002 | Catten et al. |
| 2002/0073063 | A1 | 6/2002 | Faraj |
| 2002/0138841 | A1 | 9/2002 | Ward |
| 2002/0142278 | A1 | 10/2002 | Whitehurst et al. |
| 2002/0188583 | A1 | 12/2002 | Rukavina et al. |
| 2003/0013073 | A1 | 1/2003 | Duncan et al. |
| 2003/0049593 | A1 | 3/2003 | Parmer et al. |
| 2003/0073063 | A1 | 4/2003 | Dattaray et al. |
| 2003/0073065 | A1 | 4/2003 | Riggs |
| 2003/0082508 | A1 | 5/2003 | Barney |
| 2003/0103075 | A1 | 6/2003 | Rosselot |
| 2003/0113700 | A1 | 6/2003 | Simon |
| 2003/0129576 | A1 | 7/2003 | Wood et al. |
| 2003/0151629 | A1 | 8/2003 | Krebs et al. |
| 2003/0152899 | A1 | 8/2003 | Krebs et al. |
| 2003/0152900 | A1 | 8/2003 | Krebs et al. |
| 2003/0152901 | A1 | 8/2003 | Altenhofen et al. |
| 2003/0152902 | A1 | 8/2003 | Altenhofen et al. |
| 2003/0152903 | A1 | 8/2003 | Theilmann |
| 2003/0152904 | A1 | 8/2003 | Doty, Jr. |
| 2003/0152905 | A1 | 8/2003 | Altenhofen et al. |
| 2003/0152906 | A1 | 8/2003 | Krebs et al. |
| 2003/0157470 | A1 | 8/2003 | Altenhofen et al. |
| 2003/0163784 | A1 | 8/2003 | Daniel et al. |
| 2003/0175664 | A1 | 9/2003 | Frangenheim et al. |
| 2003/0175676 | A1 | 9/2003 | Theilmann et al. |
| 2003/0195946 | A1 | 10/2003 | Yang |
| 2003/0211447 | A1 | 11/2003 | Diesel et al. |
| 2003/0224339 | A1 | 12/2003 | Jain et al. |
| 2004/0081951 | A1 | 4/2004 | Vigue et al. |

FOREIGN PATENT DOCUMENTS

| | | |
|---|---|---|
| GB | 2313250 A | 11/1997 |
| GB | 2329301 A | 3/1999 |
| GB | 2373625 A | 9/2002 |
| WO | WO 99/09490 | 2/1999 |
| WO | WO02 01467 A | 1/2002 |
| WO | WO 02/21379 | 3/2002 |
| WO | WO 02/073442 A | 9/2002 |
| WO | WO 02/091641 | 11/2002 |
| WO | WO 2004/023430 | 3/2004 |

OTHER PUBLICATIONS

Gorton, Ian, et al., 'An Efficient, Scalable Content-Based Messaging System,' *Proceedings of the Seventh IEEE International Enterprise Distributed Object Computing Conference (EDOC '03)*, Sep. 16, 2003, pp. 278-285.

Padovitz, Amir, et al., 'Awareness and Agility for Autonomic Distributed Systems: Platform-Independent Publish-Subscribe Event-Based Communication for Mobile Agents,' *Proceedings of the 14th International Workshop on Database and Expert Systems Applications (DEXA '03)*, Sep. 1, 2003, pp. 669-673.

Jörg Siekmann et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al.,"Modeling Contructivist Teaching Functionality and Structure in the KBS Hyperbook System," University of Hannover, pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

Banavar, G., et al., "An Efficient Multicast Protocol for Content-Based Publish-Subscribe Systems," Proceedings of the 19th International Conference on Distributed Computing Systems, ICDCS '99, Austin, TX, May 31-Jun. 4, 1999, International Conference on Distributed Computing Systems, Los Alamitos; CA: IEEE Computer Soc., US, May 31, 1999, pp. 262-272, XP000883611.

Global Knowledge Network, Inc., "On Demand Personal Navigator," http://kp.globalknowledge.com/products/od/index.asp, Sep. 2002, 2 pgs.

Segall, Bill and David Arnold, "Elvin Has Left the Building: A Publish/Subscribe Notification Service with Quenching," Distributed Systems Technology Centre, University of Queensland, Sep. 1997, XP002152244 AU, retrieved from the Internet: http://elvin.dstc.edu.au/document/papers/auug97/AUUG97.html.

THE451, "KnowNow Unveils 'N-Way' EAI over the Internet," TechTarget Network, XP002259981, retrieved from the Internet: http://searchwebservices.techtarget.com/original/Content/0,289142,sid26_gci75182.

Triantafillou, P., et al., "Subscription Summaries for Scalability and Efficiency in Publish/Subscribe Systems," Proceedings of the 22nd International Conference on Distributed Computing Systems Workshops (ICDCSW'02), Jul. 2, 2002, pp. 619-624, XP010601590.

x.hlp, "Sofrware for faster learning," http://www.xhlp.com/home.cfm, Apr. 2003, 7 pgs.

Chappell, David A., "Asynchronous Web Services and the Enterprise Service Bus," [online], [retrieved from the Internet Feb. 10, 2004: http://www.webservices.org/index.php/article/articlprint/352/-1/24/], May 6, 2002, XP002269724, 7 pgs.

Hapner, Mark, et al., "Java Message Service," [online], [retrieved from the Internet Mar. 13, 2001: http://java.sun.com/products/jms/documents.html], Nov. 9, 1999, XP002162780, 111 pgs.

U.S. Appl. No. 60/201,500, filed May 3, 2000, Adams.
U.S. Appl. No. 60/272,251, filed Feb. 28, 2001, Ward.
U.S. Appl. No. 60/329,088, filed Oct. 12, 2001, Riggs.
U.S. Appl. No. 60/334,714, filed Nov. 1, 2001, Diesel.
U.S. Appl. No. 60/400,606, filed Aug. 1, 2002, Diesel.

Hewlett Packard, "HP OpenView Integration Guide for Developers," Jul. 2002, [online], [retrieved from the Internet on Mar. 24, 2004: http://h21007.www2.hp.com/dspp/files/unprotected/OpenView/IntegrationGuide/OV_Integration_Guide_7_30. pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http://wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

Eugster, Patrick, et al., "Distributed Asynchronous Collections: Abstractions for Publish/Subscribe Interaction," Agilent Lab. and Lombard Odier Co., Jan. 10, 2000, pp. 1-34, XP002171795.

Shorshita, Teruji, et al., "A Large-scale Contents Distribution Architecture Based on Reliable Multicast," Proceedings Internet Workshop, 1999, IWS '99 Osaka, Japan, Feb. 18-20, 1999, pp. 75-80, XP010365597.

* cited by examiner

Learning Diary of leidig for course 50000313 until 1:24:42 PM CEST — 510

Tuesday, August 20, 2002
This course:
12:20: occupied with Introduction
15:10: occupied with Chapter1
13:20: occupied with 8640
All courses:
--------

Wednesday, August 21, 2002
This course:
13:20: occupied with 7200
00:00: occupied with 8000
13:19: occupied with 7201
15:00: exercise Chapter1-exercise-1 started
16:20: exercise Chapter1-exercise-2 started
All courses:
--------

Thursday, August 22, 2002
This course:
12:10: exercise Chapter1-exercise-1 finished
13:30: exercise Chapter1-exercise-2 finished
All courses:
12:40: attended chat Tutor-chat

Friday, August 23, 2002
This course:
22:00: occupied with Chapter2
All courses:
09:30: article Question of newsgroup coursenewsgroup read

Saturday, August 24, 2002
unknown

Sunday, August 25, 2002
All courses:
10:40: article Answer of newsgroup coursenewsgroup posted

Monday, August 26, 2002
This course:
13:20: occupied with Chapter3
All courses:
13:20: attended chat Tutor-chat Java Applet Window

CONTENT BASED MESSAGING FOR E-LEARNING INCLUDING THE EXTENSION OF A REMOTE PROCEDURE CALL

TECHNICAL FIELD

The following description relates generally to e-learning and in particular to content based messaging (CBM) for e-learning including the extension of a remote procedure call.

BACKGROUND

A CBM system may include one or more consumer that subscribe to published events. Typically, a CBM system does not provide a way for a consumer to access a remote procedure (e.g., a procedure running on another network device) because the consumer is unaware of the location of the procedure or other network device. As a result, persistence of information is not provided for because the CBM system does not save published events. Therefore, when a consumer connects to the system it is unaware of past published events. Therefore, for the above and other reasons, new methods and technology are needed to supplement traditional CBM systems and to provided for persistence in a CBM system.

SUMMARY

In one general aspect, a content based messaging-remote procedure call (CBM-RPC) protocol is provided as an extension of a CBM system that allows an application to directly access a remote procedure and, for example, obtain data returned by the procedure (e.g., stored in an associated database or storage device). An application may specify a procedure name (e.g., a unique identification (ID), such as a uniform resource identification (URI)) and parameters (e.g., a list of name/value-pairs) in a request (or a CBM-RPC), which is published to a CBM network. One or more, procedures or functions may subscribe to the request and generate responses (e.g., the requested information or a fault if the request is not valid) that are published to the CBM network.

Each procedure in the CBM system may be differentiated by an identifier. The procedure identifier may include three parts, for example, a namespace, a service class, and a procedure name. The namespace may be used to distinguish between procedures of different system applications that have the same name, and to group all procedures and service classes of one application, so that components of the CBM system may recognize the procedures associated with an application.

Procedures also may be grouped into logical procedure families called "service classes." A service class may define a service and be used to instantiate the service. The procedure name defines a name used to identify a procedure.

Each procedure may have one or more associated parameters and a return value.

A CBM-RPC request may include the identifiers of the client (i.e., the calling application), the namespace, the server (running the called procedure), the service class, and/or the procedure. The CBM-RPC request identifiers of the CBM-RPC request may be used to distinguish between different CBM-RPCs for the same procedure. The CBM-RPC request also may include one or more parameters used by a called procedure.

Other features and advantages will be apparent from the description, the drawings, and the claims.

DESCRIPTION OF DRAWINGS

FIG. 5 is an exemplary screen shot of an e-learning tutor user interface.

Like reference symbols in the various drawings indicate like elements.

DETAILED DESCRIPTION

Content Based Messaging System with Remote Procedure Call Protocol

Figure 1:
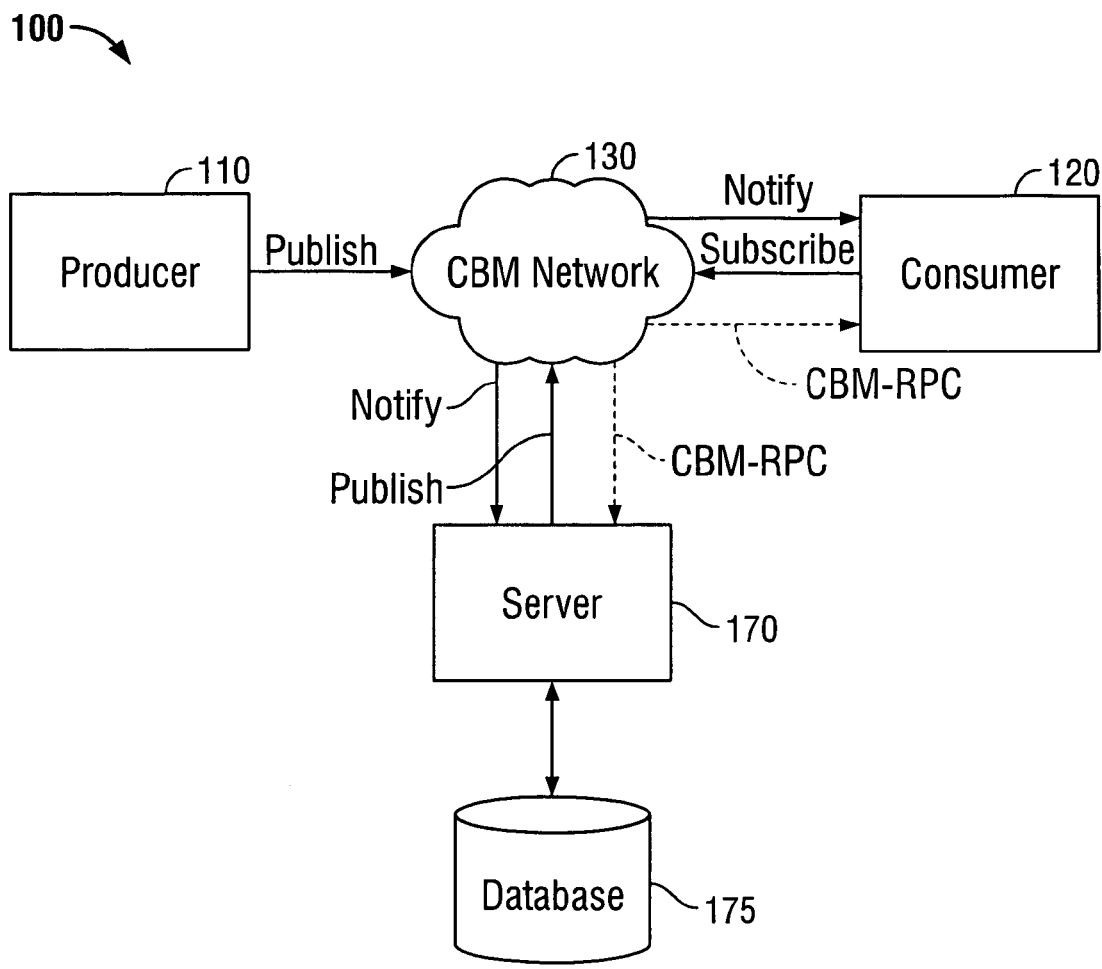
FIG. 1 is an exemplary block diagram of a content based messaging system including the extension of a remote procedure call.

A content based messaging (CBM) system, such as, for example, Elvin, CosNotif, JMS, Keryx, and Gryphon may be used to distribute information to users, clients, and applications. As shown in FIG. 1, a CBM system 100 may include one or more information producers 110 (e.g., programs or applications running on a network device, such as a processor, workstation, or server), one or more information consumers 120 (i.e., programs or applications running on a network device, such as a processor, workstation, or server), and a CBM network 130 (e.g., one or more network devices, such as a server and associated data transportation media) for receiving and distributing information. Although FIG. 1 shows only one producer and one consumer, the CBM system 100 may include multiple producers and consumers. In addition, an application may be both a producer and a consumer of information.

An information consumer registers interest (i.e., a subscription) in specific information with the CBM network 130. An information producer 110 publishes information to the CBM network 130 corresponding to an event. An event may correspond to any action taken by a program or application. The CBM network 130 provides notifications of the published information to those consumers 120 who subscribe to the information corresponding to an event.

The CBM network 130 may include one or more data processing and distributions devices (e.g., servers, associated communications media, and data transport systems). For example, the CBM network 130 may include one or more filtering servers that receive published information and generate notifications that are transmitted to consumers 120 who subscribe to the information. The filtering server may compute the registered subscriptions that match a published event and generate a notification (i.e., a description of the real world occurrence) that is sent to the consumers 120 determined from the computed subscriptions.

The CBM system 100 provides event-driven network communications that allow essentially real-time communication of information between applications by avoiding communication delays and wasted network bandwidth associated with polling for data. In addition, processing and overhead associated with addressing may be greatly reduced because each producer and each consumer do not need to know about each other (and their addresses).

The CBM system 100 also may include a server 170 providing one or more services, procedures, and/or methods that publish information to the CBM network 130. The server 170 may have an associated database or storage device 175 to store data used by the server 170 and its services, procedures, and methods. A procedure is a function that takes one or more parameter values and returns a function value or fault. A service may provide an interface for a set of procedures. A service may function as a container for a set of procedures. A service includes a service class and the semantics for each of the procedures in the service class. The semantics include an explanation of the procedures' functionality. The functionality of procedures in a service class may be related or similar.

Typically, a CBM system does not provide a way for a consumer to access a remote procedure (e.g., a procedure running on another network device) because the consumer 120 is unaware of the location (i.e., the address) of the procedure. In order to preserve the benefits of a distributed messaging system (e.g., reduced processing and bandwidth), while providing for remote access of procedures, a content based messaging-remote procedure call (CBM-RPC) protocol is provided.

The CBM-RPC protocol is an extension of the CBM network 130 that provides a way for consumers 120 (e.g., clients/applications) to make a function or a procedure call across the CBM network 130, access a remote procedure, and receive data (e.g., a return value) generated by the procedure.

As explained above, a consumer 120 of a CBM network 130 may subscribe to an event; however, the consumer in a conventional CBM system may not request information directly from a procedure. Instead, a consumer 120 waits for notifications of published information from the CBM network 130 based on a content type of the published information. In other words, an application may register with the CBM network 130 to receive notifications of published events; however, the application does not request information across the CBM network 130 directly from a procedure.

The CBM-RPC protocol is an extension of a CBM system that allows an application to directly access a remote procedure and, for example, obtain data returned by the procedure (e.g., stored in an associated database or storage device). A consumer 120 may specify a procedure name (e.g., a unique identification (ID), such as a uniform resource identification (URI)) and parameters (e.g., a list of name/value-pairs) in a request (or a CBM-RPC), which is published to the CBM network 130. One or more, procedures or functions may subscribe to the request and generate responses (e.g., the requested information or a fault if the request is not valid) that are published to the CBM network 130.

Each procedure in the CBM system may be differentiated by an identifier. The procedure identifier may include three parts, for example, a namespace, a service class, and a procedure name. The namespace may be used to distinguish between procedures of different system applications that have the same name, and to group all procedures and service classes of one application, so that components of the CBM system may recognize the procedures associated with an application. For example, a URI or other unique identifier may be used as namespace identifier. Each application may have its own procedure namespace and its own semantics of procedures implemented within an application. For example, application 1 and application 2 may both have a procedure named "getUser"; however, the procedure of application 1 may return "Elmar" while the procedure of application 2 returns "334." Therefore, the semantics of the procedures are different (i.e., name versus user ID number).

Procedures also may be grouped into logical procedure families called "service classes." A service class may define a service and be used to instantiate the service. In the following description, a "service" may be a combination of a service class name and procedures associated with the service class. The procedure name defines a name used to identify a procedure.

Each procedure may have one or more associated parameters and a return value. Both the parameters and the return value should use data types recognized by the CBM system 100. Using Elvin CBM as an example, four different data types (e.g., "int32", "int64", "real64" and "string") are supported that may be used for names, parameters, returns, and values in a notification.

If a particular CBM protocol does not provide a composite data type (e.g., a record or an array) the following composite data type may used. The composite data type identifier may be "composite." The data type may be constructed using an XML markup style and stored in a CBM notification using an ordinary string value. For example, the structure of the markup of a course member may be implemented as follows:

```
<composite>
    <string> CourseMember1 </string>
    <int32> 32 </int32>
</composite>
```

In this example, the start delimiter and end delimiter are "composite," and the tag names for the entries may be CBM datatypes.

The CBM system 100 provides for multipoint-connections. For example, two or more services having the same name may exist in the same namespace, each of which may generate a response to a CBM-RPC request. As a result, the CBM-RPC protocol may ensure that an application (i.e., a consumer or a client) only receives responses from those procedures that were called by the application using a unique identifier.

The CBM-RPC protocol provides for directed communication that is unambiguously addressed using the unique procedure identifier. Each server having registered procedures and each client running applications are provided with a unique identifier. For example, the URI of the server implementing the called procedure and the client making the call may be used as a unique identifier by the CBM-RPC protocol. Addressing may be implemented using "from" and "to" fields, as described in further detail below. A discovery protocol may be used to support the exploration of unique identifiers and their associated procedures, as explained below.

A CBM-RPC request may include the identifiers of the client (i.e., the calling application), the namespace, the server (running the called procedure), the service class, and/or the procedure. The CBM-RPC request identifiers of the CBM-RPC request may be used to distinguish between different CBM-RPCs for the same procedure. The CBM-RPC request also may include one or more parameters used by a called procedure.

A client (e.g., an application for a tutor interface) may need to determine data (e.g., the users taking an e-learning course). A procedure running on a server may provide the name of the learners taking a course. The client publishes a request to the CBM network 130 for a procedure named "getCourseMembers" of service class "course." The procedure takes a parameter of type "string" for the course name and returns a value of composite (e.g., for the names of learners taking the course). An example of such a CBM-RPC request may be implemented as follows:

```
CBM.rpc.request:   1
minor:             0
from:              "http://192.168.0.0/PresenceServlet"
to:                "http://learningsolution/stateserver"
namespace:         "http://www.sap.com/cbm/elearning"
requestid:         2783462725871
serviceclass:      "course"
method:            "getCourseMembers"
params:            "<composite><string>course</string></composite>"
course:            "sapcourse20"
```

"CBM.rpc.request" may be used to identify the major version of the protocol that is used, and "minor" may be used to indicate a minor version of the protocol that is used. The protocol versions may be used by the CBM system 100 to ensure that a compatible or correct version of the protocol is being used. "from" may be a unique identifier (e.g., a URI) of the client making the procedure call. "to" may be a unique identifier (e.g., URI) of a server to which the procedure is registered. The request ID is a unique number identifying requests so that an application may distinguish between calls and match calls to responses. The method is the name of the method used to implement the procedure. The "params" field indicates the names of the procedure parameters. Using the parameter names, the name/values pairs of the procedure parameters may be identified. The params field also indicates the correct order of the parameter values. The "course" field is the name of the course for which the information is requested. After receiving a request notification from the CBM-network 130. The server may identify the called procedure and execute the procedure to determine a result. The procedure may return a response.

A response to a request may be similar in format to the request. For example, if a response is successfully determined (e.g., the procedure was found, executed correctly, and return a result), then the CBM-RPC response is similar to the request, except that the "from" and "to" elements have been interchanged and the "params" element is replaced by a "returns" element (e.g., which includes the information requested by the application/client making the procedure call). A complete response to the CBM-RPC example described above may look like:

```
CBM.rpc.response:  1
minor:             0
from:              "http://learningsolution/stateserver"
to:                "http://192.168.0.0/PresenceServlet"
requestid:         2783462725871
namespace:         "http://www.sap.com/cbm/elearning"
serviceclass:      "course"
method:            "getCourseMembers"
returns:           "<composite><string>Markus@tutor-
                   solution</string>
    <string>tiki@learningsolution</string></composite>"
```

If there is a problem processing the CBM-RPC request, the response notification may contain a "fault" element instead of a "returns" element. The fault element may include a string value that describes a problem encountered trying to process the request. For example, a fault indicating the requested procedure does not exist may look like:

```
CBM.rpc.response:  1
minor:             0
from:              "http://learningsolution/stateserver"
to:                "http://192.168.0.0/PresenceServlet"
requestid:         2783462725871
namespace:         "http://www.sap.com/cbm/elearning"
serviceclass:      "course"
method:            "getCourseMembers"
fault:             "no such procedure!"
```

The CBM-RPC protocol does not specify a description for procedures. Therefore, clients may not know in advance the semantics and syntax of each individual procedure. As a result, clients need to be able to determine the procedure identifier, the parameters, parameter types, the return values, and return value data types associated with a particular procedure to make a remote call of the procedure. A discovery protocol may be used to explore registered services that may be called by an application. For example, the discovery protocol may be used to determine if a service is available or unavailable.

According to the discovery protocol, the client publishes a discovery request for a service to the CBM network 130. Each service class may subscribe to the CBM network 130 for discovery requests. The CBM network 130 determines all registered services matching the request and sends a notification of the request to the service. Each service then sends a response to the requesting client. The discovery request may include a namespace identifier and/or a service class. Discovery requests that only include the namespace are sent to all registered services in the namespace. If the service class name is specified in addition to the namespace identifier, the request is set to service class having the corresponding service class name within the identified namespace are returned. The service class responds to the request.

A client may specify a service class if the client knows the name of the procedure, but not the server where the procedure is registered. For example, a discovery request to explore all procedures with the service class name "course" in the given namespace http://www.sap.com/cbm/elearning may be expressed as follows:

```
CBM.rpc.discovery: 1
minor:             0
from:              "http://192.168.0.0/PresenceServlet"
namespace:         "http://www.sap.com/cbm/elearning"
serviceclass:      "course"
```

Information responses to the discovery requests are similar to discovery requests. The only information reported in the response is the identifier of the server where the service is registered (e.g., the "from" field of the CBM-RPC). The "to" field may be included but is not necessary. For example, an information response to the service request in the example above may be:

```
CBM.rpc.info:    1
minor:           0
from:            "http://learningsolution/stateserver"
to:              "http://192.168.0.0/PresenceServlet"
namespace:       "http://www.sap.com/cbm/elearning"
serviceclass:    "course"
```

A CBM-RPC library may be added to applications using the CBM system to make procedure calls. A protocol implementation of CBM may be stored an application library.

Procedures that may be implemented in conjunction with a CBM-RPC may be implemented using code that supports the basic data types described above.

Example of Procedure and Call in a CBM System

An example of a procedure "getCourseMembers" that returns the names of members that are currently online is defined in a service class called "course" and may be expressed as follows:

```
public class Course {
private Composite Members = new Composite("John","Sam");
public Composite getCourseMembers (string course) {
Composite list = course.Members);
return list ;
}
}
```

The getCourseMembers method of the course class uses a string value representing the name of the course.

Making the getCourseMembers method available using a CBM-RPC in this example includes two steps. First, the method must be registered with the CBM-RPC server and the server has to make a connection to the CBM network. This may be implemented as follows:

```
System.out.println("Attempting to start CBM-RPC Server . . . ");
String serverId = "http:/learningsolution/stateserver";
CBMRpcServer server = new CBMRpcServer(CBMURL, serverId);
System.out.println("Started successfully");
// Register our handler class as "course"
ServiceIdentifier serviceId =
new ServiceIdentifier(serverId, "http://www.sap.com/cbm/elearning",
"course");
Service s = new Service(serviceId, new Course( ));
server.addService(s);
System.out.println("Registered Course class to server.");
```

The client has to connect to the CBM network as well. The following client code fragment shown below may be used to make this connection.

```
// Connect client to CBM network
String clientId = "http://192.168.0.0/PresenceServlet";
CBMRpcClient client = new CBMRpcClient(CBMURL, clientId);
// Create the request parameters
string courseName = "BetterSale";
Parameter params = new Parameter( );
params.put("course", courseName);
// Issue a request and extract result
String serverId = "http://learningsolution/stateserver";
String namespace = = "http://www.sap.com/cbm/elearning";
String serviceClass = "course";
```

-continued

```
ServiceIdentifier serviceId
  = new ServiceIdentifier(serverId, namespace, serviceClass);
  Object result = client.execute(serviceId, "getCourseMembers",
params);
  String compositeMarkup = (String) result;
  Composite members = new Composite(compositeMarkup);
  System.out.println("Course members logged on
are"+members.toString( ));
```

After making the connection, the client specifies the procedure identifier and the parameter values for the procedure. With that information the procedure may be called. The call returns a result in form of an Object or it throws a fault (i.e., a Java Exception).

E-learning CBM

Figure 2:
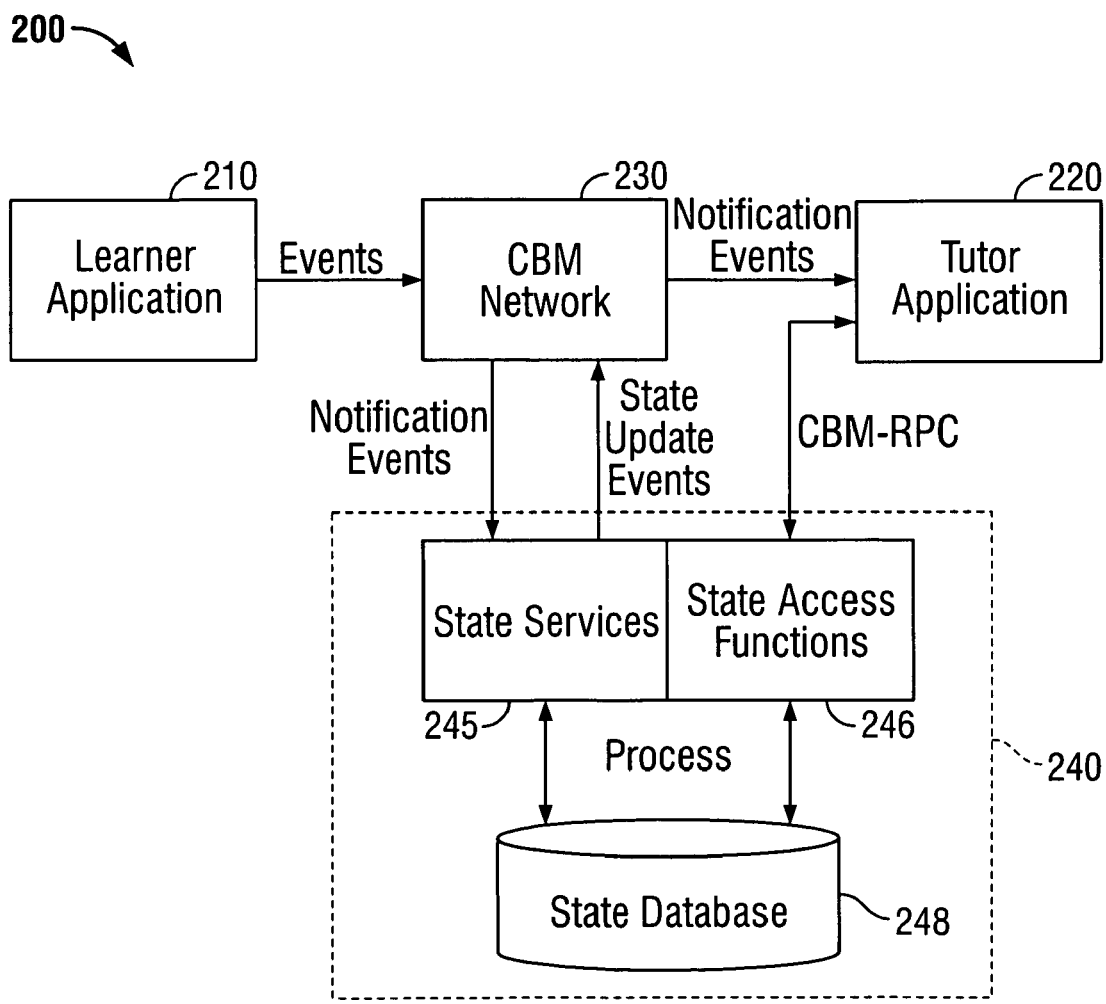
FIG. 2 is an example of an e-learning system with content based messaging including the extension of a remote procedure call.

As shown in FIG. 2, a CBM e-learning system 200 may be used to implement CBM for e-learning applications. The CBM system 200 may include one or more applications that produce or publish information, for example, a learner application 210, and one or more applications that subscribe to the published information, for example, a tutor application 220. The learning applications may be applications used by learners in an e-learning system. For example, the learner applications 210 may provide course material to the learner to take a course (e.g., including information of various multi-media types, such as text, audio, video, and graphics, exercises, tests, and collaborative communications, such as, a chat session, e-mail, or instant messaging) or the application may provide administrative support for the learning system (e.g., booking courses, managing a curriculum, and searching for information). The applications 210, 220 may provided by one or more servers of the CBM learning system 200 and/or by a learning station/client (e.g., that allows the learner to connect to the network and run applications).

The CBM network 230 may include one or more data processing and distributions devices (e.g., servers, associated communications media, and data transport systems). For example, the CBM network 230 may include one or more filtering servers that receive published information and generate notifications that are transmitted to applications who subscribe to the information. The filtering server may compute the registered subscriptions that match a published event and generate a notification (i.e., a description of the real world occurrence) that is sent to the applications determined by from the computed subscriptions.

During a training session, a learner interacts with an e-learning system using the learner applications 210. Throughout each learning session, a learner continually performs various actions as the learner interacts with the applications. For example, a learner may login, log out, join a course, leave a course, start a course, finish a course, navigate within a course, complete an exercise, read or post messages to newsgroups, join a chat session, leave a chat session, and send a chat message. Each of these exemplary actions may be regarded as an "event." Each event may be published to the CBM network 230 to notify other applications that subscribe to the learner events. The subscribing applications may be any programs running on one or more servers or clients that request notifications for events in the e-learning system (e.g., a tutor application to monitor and manage one or more learners assigned to a tutor).

As a learner performs various actions within a course causing events to take place, the state of the learner changes (e.g., the learner's position within a course). However, a CBM network is stateless system. In other words, once an event is published, the CBM network 230 does not save notifications of past published events. As a result, applications logging one the CBM network 230 after events have been published are not automatically notified of these events. Therefore, to ensure persistence of published learner events, a state system 240 may be provided. The state system 240 may include one or more servers. The servers may provide one or more state services 245 that subscribe to one or more learner events.

When a learner event is published to the CBM network 230, the CBM network computes any subscriptions matching the event. The CBM network generates a notification of the event, which is sent by the CBM network to the subscribing state service (in addition to any applications subscribing to the event). The state service may process and store information based on the notification in one or more a state databases 248 and/or other storage devices. The state service 245 also may publish state update events to the CBM network when there is a modification to the state of a learner. The CBM network may compute registered subscriptions matching the update events and generate corresponding notifications, which are sent to application registered from the update event.

The state system 240 also may include one or more servers that provide state access functions 246. The state access functions may be called using the CBM-RPC protocol described above, for example, to access information (e.g., historical data) stored in the state database. The accessed information may be used to implement a start state within an application.

Because a CBM system is stateless, any application starting after learner events have been published to the network is not aware of the past learner events. In order to establish the current learner state and any other historical data (e.g., past learner events stored in the state database), an application may call a state access function using the CBM-RPC protocol. The state access function called by the CBM-RPC accesses the requested information from the database 248 and publishes a response to the CBM network, which notifies the requesting application. The response may be used as the initial information needed by the requesting application.

An application or state service may publish event information to the CBM network 230, and the CBM network 230 may provide notifications to any subscribing applications using the event formats described in detail below. The published information provided in the notifications may be used, for example, to provide an online tutor with data regarding the actions of learners assigned to the tutor. Notification formats may be defined for each e-learning application for any events that a subscribing application wants to monitor, according to the examples described below.

Events may be grouped into one or more levels (e.g., low-level and high-level events). Low-level events may include events that are not associated with a specific service and that do not require additional processing (e.g., a Login event). High-level events may be associated with specific services (e.g., a state service) and need additional processing. An example of a high-level service is the courseMembersChanged service. High-level events may be created by services from low-level events (e.g., the courseMembersChanged event may be derived from a courseJoinedEvent and a courseLeftEvent).

Each event may be assigned a unique event identifier. An event identifier may include one or more parts, such as, for example, an eventnamespace, an eventfamily, and an eventtype. An eventnamespace may be used to distinguish between events from different applications that have the same name and to group events from one application (e.g., so that other software can easily recognize events associated with the application). Event-namespaces may use a uniform resource locator (URL) as the namespace identifier. Each learning environment may have its own event namespace and its own semantics (i.e., the specification of the conditions that meet the requirements for publishing an event) associated with events Events also may be grouped into logical event families (e.g., presence events, course events, navigation events, newsgroup events, and chat events). The event family may be used for handling events. A specific service may only register for an event family (e. g., if the family is "presence", the events are "log in" and "log out"). The service may use these events to determine information (e.g., using the previous example, a service may calculate the time as user was online).

The event-type defines a class of the event and serves as a basic identifier. All events are constructed with a string reference to the "source" that generated the event.

As described above, the CBM network includes one or more different data types, such as, for example, "int32", "int64", "real64" and "string" that may be used for values in notifications associated with published events. A composite data type may be used to represent event information that may not be expressed as one of the four data types described above, such as, for example a record or an array. For example, an array may be used to describe learners taking a course, identified as a list returned by the "getCourseMembers" procedure call. The list may have the following composite data type:

```
<composite>
    <string> CourseMember1 </string>
    <string> CourseMember2 </string>
</composite>
```

CBM Format Specification

All events used by the CBM e-learning system may be formatted using the general event format listed below.

| Name | Default | Type | Opt/Mand | Description |
|---|---|---|---|---|
| CBM.event | 0 | int32 | M | major protocol version |
| minor | 1 | int32 | M | minor protocol version |
| source | URI | String | M | unique ID of client instance, that generated the event. Suggested is the URI of the publishing application, e.g., the URI of a servlet-process. Applications may define their own unique identifier. This field can be used by consumers to resolve conflicting information from users that are running multiple clients. |

-continued

| Name | Default | Type | Opt/Mand | Description |
|---|---|---|---|---|
| time | | int64 | M | Timestamp of the event. |
| eventnamespace | URI | String | M | namespace of event |
| eventfamily | | String | M | eventfamily of event |
| eventtype | | String | M | type of event this message applies to |
| documentation | | String | O | human readable information about this event |
| params | | composite | M | identifiers of parameters in this message. This field is a composition of string elements and stored in an ordinary string |

Any number of different events may be provided for by the CBM system. Examples of events may include presence events, course events, navigation events, newsgroup events, and chat events. Exemplary formats for each of these families of events is describe in detail below.

Presence events may be used to indicate the presence of a learner (e.g., connection to the e-learning system). For example, presence events may include a LoginEvent and a LogoutEvent. A "LoginEvent" may occur when a user (e.g., a learner or a tutor) connects to the learning system. A login event may be expressed using the following format: eventfamily="presence" of type "string"; eventtype="LoginEvent" of type string; parameters including ["user"] of type composite; and having a user="userID" of type string (e.g., any string that uniquely identifies the user, such as an E-Mail-address). The following example illustrates a login event format:

| | |
|---|---|
| cbm.event: | 1 |
| minor: | 0 |
| source: | "http://192.168.0.0/LoginServlet" |
| time: | 157235472547 |
| eventnamespace: | "http://www.sap.com/cbm/elearning" |
| eventfamily: | "presence" |
| eventtype: | "LoginEvent" |
| documentation: | "User has logged in" |
| params: | "<composite><string>user</string></composite>" |
| user: | "twiki@learningsolution" |

A logout event may occur when a user leaves the learning environment (e.g., disconnects with the learning system). The logout event may have the following format: eventfamily="presence" of type "string"; eventtype="LogoutEvent" of type string; parameters including ["user"] of type composite; and having a user="userID" of type string (e.g., any string that uniquely identifies the user, such as an E-Mail-address). An example of a logout event may be expressed as follows:

| | |
|---|---|
| cbm.event: | 1 |
| minor: | 0 |
| source: | "http://192.168.0.0/LoginServlet" |
| time: | 157235472547 |
| eventnamespace: | "http://www.sap.com/cbm/elearning" |
| eventfamily: | "presence" |
| eventtype: | "LogoutEvent" |
| documentation: | "User has logged out" |
| params: | "<composite><string>user</string></composite>" |
| user: | "twiki@learningsolution" |

Course events may be used to indicate information about courses within the e-learning system and may include CourseJoinedEvent, CourseLeftEevent, and CourseMemberChangedEvent.

A "CourseJoinedEvent" occurs when a user enters a course. For learners this event may indicate that the learner is interacting with the course. For tutors this event may indicate that a tutor is present within a course to assist learners taking the course. The CourseJoinedEvent may have the following format: eventfamily="course" of type "string"; eventtype="CourseJoinedEvent" of type string; parameters may include ["user", "course"] of type composite; a user="userID" of type string (e.g., any string that uniquely identifies the user, such as an E-Mail-address), and a course="courseID" of type string (e.g., a unique course name). An example of a CourseJoinedEvent may be expressed as follows:

| | |
|---|---|
| cbm.event: | 1 |
| minor: | 0 |
| source: | "http://192.168.0.0/CourseLoginServlet" |
| time: | 157235472547 |
| eventnamespace: | "http://www.sap.com/cbm/elearning" |
| eventfamily: | "course" |
| eventtype: | "CourseJoinedEvent" |
| documentation: | "User has entered a course" |
| params: | "<composite><string>user</string><string>course</string></composite>" |
| user: | "twiki@learningsolution" |
| course: | "sap20courses/beginnerscourse" |

A CourseLeftEvent occurs when a user leaves a course. For learners this event may indicate that the learner has stopped interacting with the course. For tutors this event may indicate that a tutor is unavailable to assist learners of the course. The CourseLeftEvent may have the following format: eventfamily="course" of type "string"; eventtype="CourseLeftEvent" of type string; parameters including ["user", "course"] of type composite; a user="userID" of type string (e.g., any string that uniquely identifies the user, such as an E-Mail-address), and a course="courseID" of type string (e.g., a unique course name). An example of a CourseLeftEvent may be expressed as follows:

EXAMPLE

| | |
|---|---|
| cbm.event: | 1 |
| minor: | 0 |
| source: | "http://192.168.0.0/CourseLogoutServlet" |
| time: | 157235472547 |
| eventnamespace: | "http://www.sap.com/cbm/elearning" |
| eventfamily: | "course" |
| eventtype: | "CourseLeftEvent" |
| documentation: | "User has left a course" |
| params: | "<composite><string>user</string><string>course</string></composite>" |
| user: | "twiki@learningsolution" |
| course: | "sap20courses/beginnerscourse" |

The CourseMembersChangedEvent is a high-level event that may be published by a state service that subscribes to the CourseJoinedEvent and the CourseLeftEvents. The state service may update an associated course member table from these events and publish the update as a CourseMembersChangedEvent notification. Course members may be those members that are currently online actively participating in the course. The CourseMembersChangedEvent may have the following format: eventfamily="course" of type "string"; eventtype="CourseMembersChangedEvent" of type string; parameters including ["course", "members"] of type composite; a course="courseID" of type string (e.g., a unique course name); and members=["user1", "user2", ... ] of type composite. An example of a CourseMembersChangedEvent may be expressed as follows:

| | |
|---|---|
| cbm.event: | 1 |
| minor: | 0 |
| source: | "http://192.168.0.0/CourseService" |
| time: | 157235472547 |
| eventnamespace: | "http://www.sap.com/cbm/elearning" |
| eventfamily: | "course" |
| eventtype: | "CourseMembersChangedEvent" |
| documentation: | "List of all users in the course" |
| params: | "<composite><string>course</string><string>members</string></composite>" |
| course: | "sap20courses/beginnerscourse" |
| members: | "<composite><string>twiki@learningsolution</string><string>markus@tutorsolution</string></composite>" |

Navigation Events may be used to indicate the actions of a user within a course. Navigation events may include CoursePositionChangedEvent, ExerciseStartedEvent, and ExerciseFinishedEvent.

E-learning courses may be divided into different sections that a learner progresses through as the learner takes the course. The CoursePositionChangedEvent may be used to indicate when a learner moves from one section to another. This format does not dictate the way in which a course is divided and structured. Instead, the position inside a course may be defined by a unique positioning string. The CoursePositionChangedEvent may have the following format: eventfamily="navigation" of type "string"; eventtype="CoursePositionChangedEvent" of type string; parameters including ["learner", "course", "position"] of type composite; a learner=userID of type string (e.g., a unique identifier, such as an email address; a course="courseID" of type string (e.g., a unique course name); and a position="positionID" of type string. An example of a CoursePositionChangedEvent may be expressed as follows:

| | |
|---|---|
| CBM.event: | 1 |
| minor: | 0 |
| source: | "http://192.168.0.0/Mediator" |
| time: | 157235472547 |
| eventnamespace: | "http://www.sap.com/cbm/elearning" |
| eventfamily: | "navigation" |
| eventtype: | "CoursePositionChangedEvent" |
| documentation: | "Subject, learner is dealing with" |
| params: | "<composite><string>learner</string><string>course</string><string>position</string></composite>" |
| learner: | "twiki@learningsolution" |
| course: | "sap20courses/beginnerscourse" |
| position: | "sap20courses/beginnerscourse/chapter23" |

E-learning courses may include various exercises (e.g., a working example, a practice problem, a quiz, or a test) that a learner performs while taking the course. The ExerciseStartedEvent may be used to indicate when a learner starts an exercise of a course. The ExerciseStartedEvent may have the following format: eventfamily="navigation" of type "string"; eventtype "ExerciseStartedEvent" of type string; parameters including ["learner", "course", "exercise"] of type composite; a learner=userID of type string (e.g., a unique identifier, such as an email address; a course="courseID" of type string (e.g., a unique course name); and a exercise="exerciseID" of type string (e.g., a unique exercise name) An example of an ExerciseStartedEvent may be expressed as follows:

| | |
|---|---|
| CBM.event: | 1 |
| minor: | 0 |
| source: | "http://192.168.0.0/Mediator" |
| time: | 157235472547 |
| eventnamespace: | "http://www.sap.com/cbm/elearning" |
| eventfamily: | "navigation" |
| eventtype: | "ExerciseStartedEvent" |
| documentation: | "User has started an exercise" |
| params: | "<composite><string>learner</string><string>course</string></string>exercise</string></composite>" |
| learner: | "twiki@learningsolution" |
| course: | "sap20courses/beginnerscourse" |
| exercise: | "sap20courses/beginnerscourse/chapter23/exercise2" |

An ExerciseFinishedEvent may be used to indicate when a learner has completed or finished an exercise of a course. The ExerciseFinishedEvent may have the following format: eventfamily="navigation" of type "string"; eventtype="ExerciseFinishedEvent" of type string; parameters including ["learner", "course", "exercise"] of type composite; a learner=userID of type string (e.g., a unique identifier, such as an email address; a course="courseID" of type string (e.g., a unique course name); and a exercise="exerciseID" of type string (e.g., a unique exercise name). An example of an ExerciseStartedEvent may be expressed as follows:

| | |
|---|---|
| CBM.event: | 1 |
| minor: | 0 |
| source: | "http://192.168.0.0/Mediator" |
| time: | 157235472547 |
| eventnamespace: | "http://www.sap.com/cbm/elearning" |
| eventfamily: | "navigation" |
| eventtype: | "ExerciseFinishedEvent" |
| documentation: | "User has finished an exercise" |
| params: | "<composite><string>learner</string><string>course</string><string>exercise</string></composite>" |
| learner: | "twiki@learningsolution" |
| course: | "sap20courses/beginnerscourse" |
| exercise: | "sap20courses/beginnerscourse/chapter23/exercise2 |

Newsgroup events may indicate when a user interacts with a newsgroup (e.g., articles from a publication). Newsgroup events may include a NewsgroupOpenedEvent, a NewsgroupArticleOpenedEvent, and a NewsgroupArticlePostedEvent.

Newsgroups may be used to exchange information within an e-learning environment. For example, newsgroups may be implemented using a blackboard/message board where learners and tutors may read and post articles (e.g., notes, questions, answers, and comments) regarding a course.

Tutors may be interested whether a learner has opened a newsgroup and has read article headlines associated with a newsgroup. The NewsgroupOpenedEvent may be used to indicate when a user opens a newsgroup and reads the article names. The NewsgroupOpenedEvent may have the following format: eventfamily="newsgroup" of type "string"; eventtype="NewsgroupOpenedEvent" of type string; parameters including ["user", "newsgroup"] of type composite; a user=userID of type string (e.g., a unique identifier, such as an email address; and a newsgroup="newsgroupID" of type string (e.g., a unique newsgroup name). An example of an NewsgroupOpenedEvent may be expressed as follows:

```
CBM.event:         1
minor:             0
source:            "http://192.168.0.0/Mediator"
time:              157235472547
eventnamespace:    "http://www.sap.com/cbm/elearning"
eventfamily:       "newsgroup"
eventtype:         "NewsgroupOpenedEvent"
documentation:     "User has opened a newsgroup"
params:            "<composite><string>user</string>
                   <string>newsgroup</string></composite>"
user:              "twiki@learningsolution"
newsgroup:         "sap20courses/beginnerscourse/newsgroup"
```

The NewsgroupArticleOpenedEvent may be used to indicate when a user opens an article in a newsgroup in order to read the article. The NewsgroupOpenedEvent may have the following format: eventfamily="newsgroup" of type "string"; eventtype="NewsgroupArticleOpenedEvent" of type string; parameters including ["user", "newsgroup", and "articlename"] of type composite; a user=userID of type string (e.g., a unique identifier, such as an email address; a newsgroup="newsgroupID" of type string (e.g., a unique newsgroup name), and an articlename="articleID" of type string (e.g., a unique article name, such as an article headline). An example of an NewsgroupArticleOpenedEvent may be expressed as follows:

```
CBM.event:         1
minor:             0
source:            "http://192.168.0.0/NewsgroupManagerServlet"
time:              157235472547
eventnamespace:    "http://www.sap.com/cbm/elearning"
eventfamily:       "newsgroup"
eventtype:         "NewsgroupArticleOpenedEvent"
documentation:     "User has opened a newsgroup article"
params:            "<composite><string>user</string>
                   <string>newsgroup</string><string>articlename
                   </string></composite>"
user:              "twiki@learningsolution"
newsgroup:         "sap20courses/beginnerscourse/newsgroup"
articlename:       "welcome to this newsgroup"
```

The NewsgroupArticlePostedEvent may be used to indicate when a user sends an article to a newsgroup. The NewsgroupArticlePostedEvent may have the following format: eventfamily="newsgroup" of type "string"; eventtype="NewsgroupArticlePostedEvent" of type string; parameters including ["user", "newsgroup", "articlename", and "articletext"] of type composite; a user=userID of type string (e.g., a unique identifier, such as an email address; a newsgroup="newsgroupID" of type string (e.g., a unique newsgroup name); an articlename="articleID" of type string (e.g., a unique article name, such as an article headline), and article text="text of article" of type string. An example of an NewsgroupArticlePostedEvent may be expressed as follows:

```
CBM.event:         1
minor:             0
source:            "http://192.168.0.0/NewsgroupManagerServlet"
time:              157235472547
eventnamespace:    "http://www.sap.com/cbm/elearning"
eventfamily:       "newsgroup"
eventtype:         "NewsgroupArticlePostedEvent"
documentation:     "User has posted a newsgroup article"
params:            "<composite><string>user</string>
                   <string>newsgroup</string><string>article
                   </string><string>articletext</string></composite>"
user:              "twiki@learningsolution"
newsgroup:         "sap20courses/beginnerscourse/newsgroup"
articlename:       "welcome to this newsgroup"
articletext:       "I want to welcome you to . . . "
```

The e-learning system 200 may provide for interactive events between users (e.g., Chat Events). Chat events may include ChatjoinedEvent, ChatLeftEvent, ChatMessageEvent, and ChatMembersChangedEvent.

The ChatJoinedEvent may be used to indicate when a user joins a chat session. The ChatJoinedEvent may have the following format: eventfamily="chat" of type "string"; eventtype="ChatJoinedEvent" of type string; parameters including ["user", "chat"] of type composite; a user=userID of type string (e.g., a unique identifier, such as an email address; and a chat="chatID" of type string (e.g., a unique chat identifier). An example of an ChatJoinedEvent may be expressed as follows:

```
CBM.event:         1
minor:             0
source:            "http://192.168.0.0/Mediator"
time:              157235472547
eventnamespace:    "http://www.sap.com/cbm/elearning"
eventfamily:       "chat"
eventtype:         "ChatJoinedEvent"
documentation:     "User has joined a chat"
params:            "<composite><string>user</string>
                   <string>chat</string></composite>"
user:              "twiki@learningsolution"
chat:              "sap20courses/beginnerscourse/chatgroup"
```

The ChatLeftEvent may be used to indicate when a user exits a chat session. The ChatLeftEvent may have the following format: eventfamily="chat" of type "string"; eventtype="ChatLeftEvent" of type string; parameters including ["user", "chat"] of type composite; a user=userID of type string (e.g., a unique identifier, such as an email address; and a chat="chatID" of type string (e.g., a unique chat identifier). An example of a ChatLeftEvent may be expressed as follows:

```
CBM.event:         1
minor:             0
source:            "http://192.168.0.0/Mediator"
time:              157235472547
eventnamespace:    "http://www.sap.com/cbm/elearning"
eventfamily:       "chat"
eventtype:         "ChatLeftEvent"
documentation:     "User has left a chat"
params:            "<composite><string>user</string>
```

The ChatMessageEvent may be used to indicate when a user sends a message in a chat room. The ChatMessageEvent may have the following format: eventfamily="chat" of type "string"; eventtype="ChatMessageEvent" of type string; parameters including ["user", "chat", "Chatmessage"] of type composite; a user=userID of type string (e.g., a unique identifier, such as an email address; a chat="chatID" of type string (e.g., a unique chat identifier), and chatmessage=message text of type string. An example of a ChatMessageEvent may be expressed as follows:

| | |
|---|---|
| CBM.event: | 1 |
| minor: | 0 |
| source: | "http://192.168.0.0/ChatApplet" |
| time: | 157235472547 |
| eventnamespace: | "http://www.sap.com/cbm/elearning" |
| eventfamily: | "chat" |
| eventtype: | "ChatMessageEvent" |
| documentation: | "User has sent a chat message" |
| params: | "<composite><string>user</string> <string>chat</string><string>chatmessage </string></composite>" |
| user: | "twiki@learningsolution" |
| chat: | "sap20courses/beginnerscourse/chatgroup" |
| chatmessage: | "Hi there . . . :-)" |

The ChatMembersChangedEvent is a high-level event that is usually published by a state service that subscribes to a ChatJoinedEvent and a ChatLeftEvent. The ChatMembers-ChangedEvent state service updates a chat room member table from the ChatJoinedEvent or the ChatLeftEvent and publishes a ChatMembersChangedEvent notification. The ChatMembersChangedEvent may have the following format: eventfamily="chat" of type "string"; eventtype="ChatMembersChangedEvent" of type string; parameters including ["chat", "members"] of type composite; a chat="chatID" of type string (e.g., a unique chat identifier), and members=["user1", "user2", . . . ] of type composite. An example of a ChatMembersChangedEvent may be expressed as follows:

| | |
|---|---|
| CBM.event: | 1 |
| minor: | 0 |
| source: | "http://192.168.0.0/CourseService" |
| time: | 157235472547 |
| eventnamespace: | "http://www.sap.com/cbm/elearning" |
| eventfamily: | "chat" |
| eventtype: | "ChatMembersChangedEvent" |
| documentation: | "List of all users in the chatgroup" |
| params: | "<composite><string>chat</string> <string>members</string></composite>" |
| chat: | "sap20courses/chat" |
| members: | "<composite><string>twiki@learningsolution</string> <string>markus@tutorsolution</string></composite>" |

Tutor Services

An important aspect of providing a suitable e-learning environment includes providing adequate support for the learners using the system. One aspect of proving adequate support is to oversee the progress of a learner and provide guidance and assistance based on the actions of a learner. However, online tutors are not able to have the personal or face-to-face contact with the learners to provide the oversight typically available from classroom based training.

Support for online learning is important to ensure that the needs of each learner are addressed. Although each learner may take the same training and/or courses, each learner has individual preferences, strengths, weaknesses, abilities, skills, knowledge, and know-how. As a result, different learners have different needs and require different support for their online training.

To provide for individual learner needs and generally improve the support for learning in an e-learning environment, the progress and interaction of learners with the learning material and learning system may be monitored using a CBM system 200. In particular, the actions of online learners and an overview of their dynamic learning state may be monitored to provide support for the individual learner. Tutors may observe the actions of online learners and their dynamic learning state to provide support and guidance when needed using the CBM system 200.

Monitoring of individual learners and their interaction with the learning system may be provided by a number of services provided, for example, by the state services of the state system 240. Examples of state services that may be provided to monitor learner events include a WatchlistService, a CourseMemberService, a DiaryService, and a LearnerService.

The WatchlistService generates a watchlist for a tutor. The watch list provides a list of all courses that the tutor wishes to monitor. The Watchlist may be implemented using two CBM-RPCs, for example, "getwatchlist" and "setWatchlist." The procedure getwatchlist may include the parameter tutor of type string and generate a return Watchlist of type composite. The procedure setwatchlist may include parameters tutor of type string and watchlist of type composite and return an indication Ok of type int32. Course names returned by the watchlist CBM-RPC may be stored in a file "watchlist.txt." The file may be stored in a directory of the server where the watchlist service is running. The file may be used to initialize a tutor application with the course names to populate in a watchlist window.

The CourseMemberService may be used to determine the members of a course, such as, for example, the names of the learners that are registered to take the course. The CourseMembers may be determined using four CBM-RPCs, for example, "getLearnersRegistered," "setLearnersRegistered," "getLearnersOnline," and "setLearnersOnline." The procedure getLearnersRegistered may include the parameter coursename of type string and generate a return of learner names of type composite. The procedure setLearnersRegistered may include parameters coursename of type string and learnerlist of type composite and return an indication Ok of type int32. The course names returned by the CBM-RPC to the CourseMemberService may be stored in a file "learnerlist.txt." The file may be stored in a directory of the server where the CourseMemberService is running. The file may be used to initialize a tutor application to populate a course window with the names of learners of a course assigned to a tutor.

The CourseMemberService also may be used to determine the learners as a subgroup of the registered learners that are currently online (e.g., learners actively participating in the course) using the procedures getLearnersOnline and setLearnersOnline. The procedure getLearnersOnline may include the parameter coursename of type string and generate a return learners of type composite. The procedure setLearnersOnline may include parameters coursename of type string and learnerlist of type composite and return an indication Ok of type int32. Course names returned by a CBM-RPC of the CourseMemberService may be stored in a file "coursejoined.txt." The file may be stored in a directory of the server where the CourseMemberService is running.

The file may be used to initialize a tutor application with the learners' names to implement a course window.

The course member service also may publish update events to indicate when the state of the group of online learners changes. For example, the service may publish an update event to indicate that a learner's state has changed from online to offline. The tutor application may subscribe to the update event and use a notification to change the indication of the learner's current status in the course window.

The Diary service stores a summary of the actions for each learner of the e-learning system for a specified period of time (e.g., a day, a week, and/or a month). The summary may include the name and the time of each action with the course performed by a learner. The Diary may be implemented using two CBM-RPCs getsummary and clearDiary. The procedure getSummary may include the parameters learner of type string, course of type string, and timemillis of type int64. The procedure clearDiary may include parameter learner of type string and return an indication Ok of type int32. The diary returned by a CBM-RPC of the DiaryService may be stored in a file "learnerdiary.txt." The file may be stored in a directory of the server where the Diary service is running. The file may be used to initialize a tutor application with the past acts of a learner over time to implement a diary window.

The LearnerService may be used to store the actual current occupation for each learner (e.g., the position of a learner or the current interaction of a learner with a course). The LearnerOccupation may be implemented using two CBM-RPCs of getCurrentOccupation and setcurrentoccupation. The method getCurrentOccupation may include the parameter learner of type string and generate a return of occupation of type string. The method setCurrentOccupation may include parameters learner of type string and occupation of type string and return an indication Ok of type int32. Occupations returned by a CBM-RPC of the LearnerService may be stored in a file "occupations.txt." The file may be stored in a directory of the server where the Diary service is running. The file may be used to initialize a tutor application to populate a course window with the occupation of each learner in a course.

Tutor Monitoring Process

Figure 3:
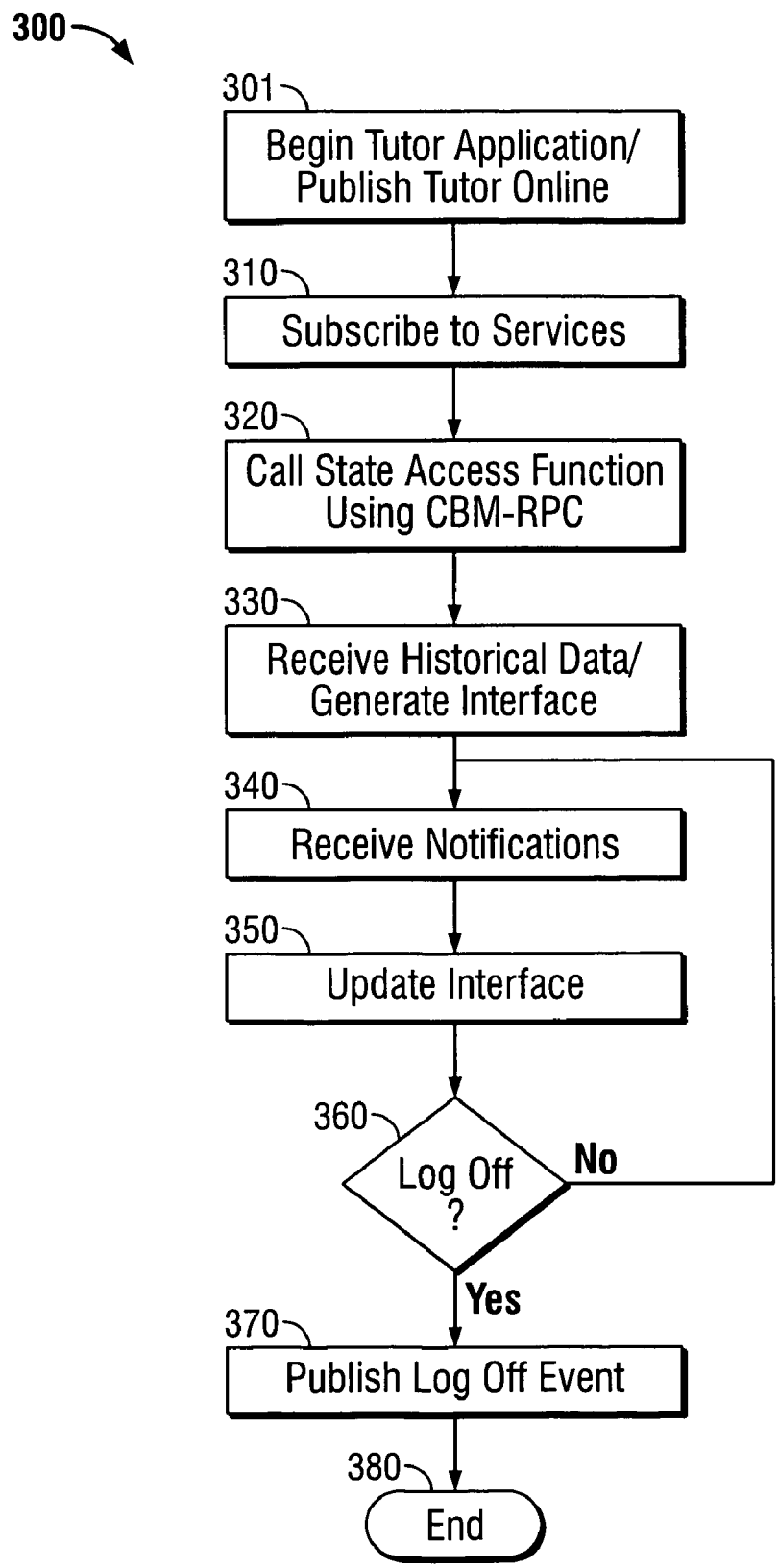
FIG. 3 is an exemplary process for an e-learning tutoring application.

FIG. 3 shows a process 300 that may be used by a tutor to monitor an e-learning system. The tutor using a client device (e.g., a computer or work station) may initiate a tutor application by selecting the application and starting the application (301). The tutor application may publish a message to the CBM system 200 that the tutor is online and available to provide assistance. The tutor application subscribes to the CBM network and a number of services (e.g., a WatchlistService, a CourseMemberService, a DiaryService, and a LearnerService) provided by a state system 240 (310). The tutor application may make one or more CBM-RPCs of state access functions of the state system 240 using the CBM-RPC protocol (320). The tutor application receives data from the state system 240 returned as responses to the CBM-RPCs (330). The data may be used to populate a tutor interface with information used by a tutor to monitor and manage learners. Events and update events published to the CBM network from learner applications and states services, respectively, are continually provided to the tutor application as notifications (340). The notifications are used to update information displayed in the tutor interface (350). The tutor application may determines when the tutor logs-off (360). The application may publish a notification to the system that the tutor has logged off to inform learner applications that the tutor in no longer available to provide assistance (370) and end (380).

Tutor Interface

The e-learning system may be provided with a tutor application that assists a tutor to monitor and manage one or more learners. The tutor application may provide a graphic user interface that allows the tutor to monitor and determine information about learners that use the e-learning system. The tutor interface may be implemented using a tutor application that functions in conjunction with a browser to display learner information in the interface. The tutor application may be provided with an application program interface (API) that uses published update events from the state services described above (e.g., a WatchlistService, a CourseMemberService, a DiaryService, and a LearnerService) and CBM-RPCs to gather information that is used to populate one or more windows and/or fields in the interface.

Figure 4:
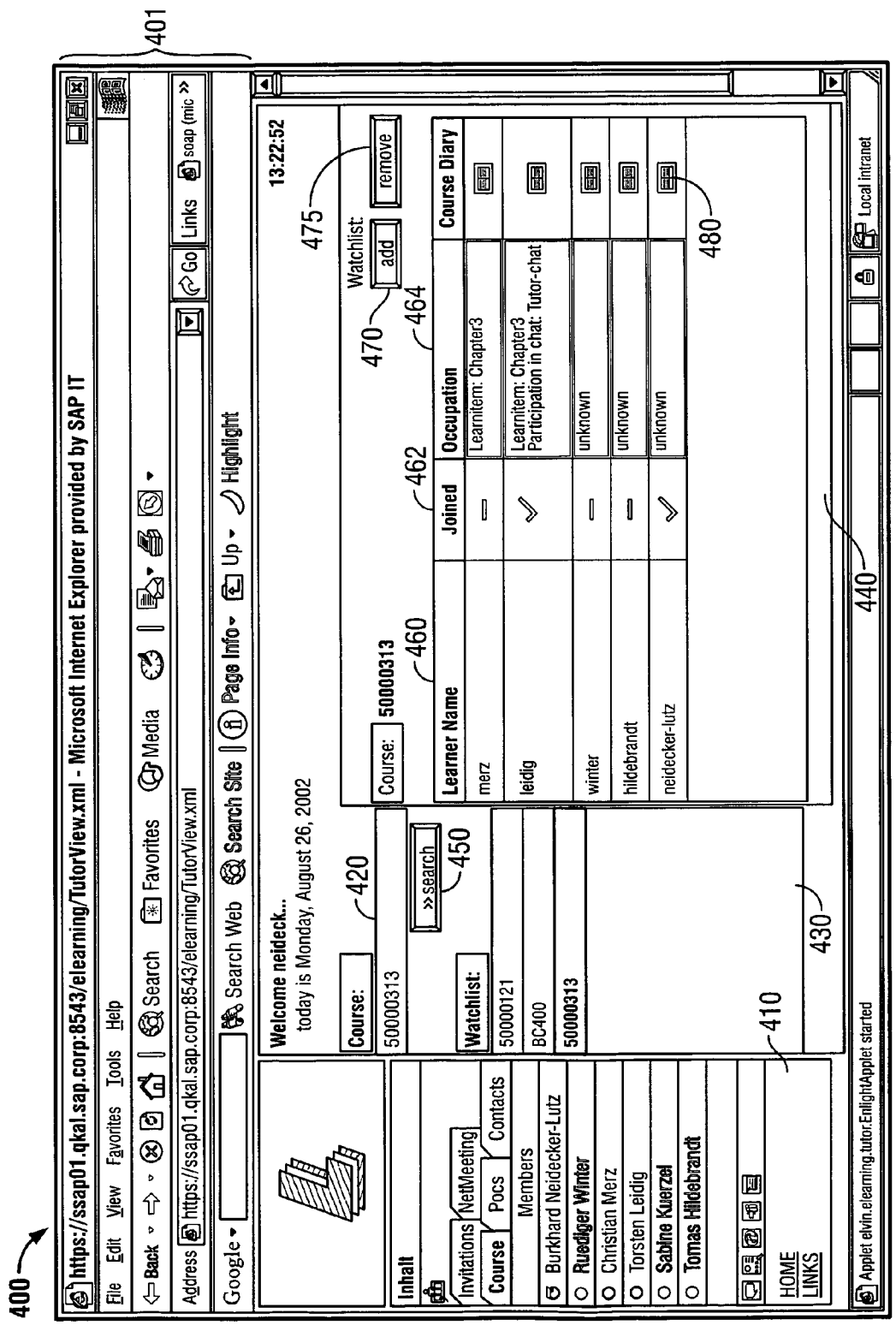
FIG. 4 is an exemplary screen shot of an e-learning tutor user interface.

As shown in FIG. 4, a tutor interface 400 may be provided to offer tutors an overview of the courses and activities of learners that a tutor monitors. Using the interface 400, the tutor may gain insight into the activities of learners, provide better assistance to the learners in their online activities, and generally provide support to the learners. The tutor interface 400 may provide a number of menus bars and tool bars 401 to activate and control functions of the interface 400. The tutor interface 400 also may include one or more fields and windows that provide functions and information to the tutor. For example, the tutor interface 400 also may include a messaging window 410, a course search field 420, a watch list window 430, and a course window 440. The windows may be populated with information provided by the tutor application. The information may include data derived from published learner events, published update events, and CBM-RPCs.

The messaging window may provide the tutor with an instant messaging feature. The messaging window may provide a list of users that the tutor frequently contacts or monitors online (e.g., course instructors, other tutors, and learners). Selecting a name from the list may cause a message window to appear in which the tutor may send a message or join a chat. The messaging window provides one way in which a tutor may directly contact a learner who is online and provide assistance to the learner. Scroll bars may be provided to view of any information that may not be immediately displayed within the window (e.g., due to size or the amount of information included in the window).

A search field may be used to implement a course search function. A course may be selected (e.g., from a drop-down menu) or entered in the field (e.g., using a user input device). Activation of a search button 450 causes the tutor application to search for a specified course or provide a list of courses meeting a search criterion. The tutor may select a course that is returned by the search function and add the course to the watch list.

The watch list window may include a list of all courses (e.g., all course for which the tutor is responsible). A watch list may be maintained for each tutor. A course may be selected from the list using an input device (e.g., a mouse, a touchpad, a keypad, a pointer, or a keyboard). Selecting a course from the watch list populates the course window within information regarding the selected course.

A course window may provide the tutor with information about learner activities for a selected course. The window may include a name or identification of the course for which the window is populated. The window may display a list 460 of one or more indications (e.g., an ID or a name of a learner) associated with all learners enrolled in a course. Selection of the name from the list may activate a messaging feature (e.g., e-mail, chat, or instant message) allowing the tutor establish a dialog with the selected learner. The display also may include an indication 462 (e.g., a check or a minus) of whether the learner is currently engaged in any activities with the course. If the learner is engaged in a course activity, the display also may include a description of the activity 464 (e.g., an indication of the learner's position within a course, such as "Chapter 3").

The course window also may include one or more buttons or other input features that allow the tutor to interact with the course window. For example, a course add 470 and course remove 475 button may be provided allowing the tutor to add or remove the course from the watch list, respectively.

A course diary icon 480 may be provided for each learner. Selection of the icon 480 causes a diary window 500 to appear, as shown in FIG. 5. The diary window 500 may include a number of sections 510 that describe the historical activities of a learner within the course. For example, the activities of a learner may be divided into various periods of time (e.g., days, weeks, and/or months). The period of time may be selected from a menu or set a property of the tutor application. The activity of a learner at a particular date and time may be provided within one the sections 510 corresponding to the time period. In this way, the tutor may be provided with a general overview of the activities of learners within a course over the period of time.

The e-learning CBM-RPC protocol, tutor application, and tutor interface provides an architecture that supplies a tutor with valuable insight to the activities of the learners of an e-learning system not available from other computer based training systems. The insight allows the tutor to monitor the dynamic state of a leaner and may be used to provide individualize support for the learners, enhance their e-learning experience, and to augment the knowledge gained from using an e-learning system.

A number of implementations have been described. Nevertheless, it will be understood that various modifications may be made. For example, suitable results may be achieved if the steps of the disclosed techniques are performed in a different order and/or if components in a disclosed system, architecture, device, or circuit are combined in a different manner and/or replaced or supplemented by other components. Accordingly, other implementations are within the scope of the following claims.

What is claimed is:

1. A content based messaging (CBM) system including the extension of a remote procedure call (RPC) comprising:
   a producer application to publish information corresponding to an event;
   a subscriber application, wherein:
      the subscriber application subscribes to the published information, and
      the subscriber application is configured to publish a CBM-RPC request to directly access a remote procedure and obtain data generated by the remote procedure;
   a CBM network to receive the CBM-RPC request and to transmit a request notification to the remote procedure; and
   a distribution device located on the CBM network to receive the published information from the producer application and deliver the published information to the subscriber application, wherein:
   the remote procedure is configured to receive the request notification, process the request notification, and publish a return value to the CBM network,
   the CBM network is configured to receive the return value, determine the subscriber application subscribing to the return value, and publish the return value to the subscriber application, and
   the CBM-RPC request includes a request identifier to distinguish the CBM-RPC request from other CBM-RPC requests published by the subscriber application and to match the CBM-RPC request to its corresponding return value.

2. The system of claim 1 wherein the CBM network determines the remote procedure based on a subscription to the CBM network from the remote procedure.

3. The system of claim 1 wherein the CBM network determines the remote procedure based on a subscription to the CBM network from the remote procedure and the request identifier.

4. The system of claim 3 wherein the request identifier includes a namespace to distinguish between procedures that have the same name.

5. The system of claim 3 wherein the request identifier includes a service class used to group one or more procedures into a logical family of one or more procedures.

6. The system of claim 3 wherein the request identifier includes a procedure name.

7. The system of claim 3 wherein the request identifier includes an identifier of the application, a namespace, and a service class.

8. The system of claim 1 wherein the CBM-RPC request includes a procedure identification and parameters.

9. The system of claim 8 wherein the parameters are name and value pairs.

10. The system of claim 1 wherein the return value includes information requested by the subscriber application.

11. The system of claim 1 wherein the return value includes a fault if the CBM-RPC request is not valid.

12. The system of claim 1 wherein the request identifier includes a namespace to distinguish between procedures that have the same name.

13. The system of claim 1 wherein the request identifier includes a service class used to group one or more procedures into a logical family of one or more procedures.

14. The system of claim 1 wherein the request identifier includes a procedure name.

15. The system of claim 1 wherein the request identifier includes an identifier of the application, a namespace, and a service class.

16. The system of claim 1 further comprising a database wherein the remote procedure is configured to access the database and to include information in the return value based on the accessed data.

17. The system of claim 16 wherein the remote procedure is a state access function to access learner information stored in the database.

18. The system of claim 1 wherein the request identifier include an identification number to distinguish the CBM-RPC request from other CBM-RPC requests published by the subscriber application and to match the CBM-RPC request to its corresponding return value.

19. A method for generating a content based messaging (CBM)-remote procedure call (RPC) comprising:
   receiving, at a CBM network, published information from a producer application;

delivering the published information, via a distribution device located at the CBM network, to a subscriber application that subscribes to the published information, the subscriber application being configured to directly access a remote procedure and obtain data generated by the remote procedure;

receiving, at the CBM network, a CBM-RPC request from the subscriber application;

transmitting, at the CBM network, a request notification to the remote procedure;

receiving, at the CBM network, a return value from the remote procedure, which subscribes to the request notification;

determining, at the CBM network, the subscriber application requesting the return value; and publishing the return value to the subscriber application, wherein:

receiving the CBM-RPC request includes receiving a request identifier to distinguish the CBM-RPC request from other CBM-RPC requests published by the subscriber application and to match the CBM-RPC request to its corresponding return value.

20. The method of claim 19 further comprising determining the remote procedure based on a subscription to the CBM network from the remote procedure.

21. The method of claim 19 further comprising determining the remote procedure based on a subscription to the CBM network from the remote procedure and the request identifier.

22. The method of claim 21 wherein determining the remote procedure includes determining a namespace of the request identifier to distinguish between procedures that have the same name.

23. The method of claim 21 wherein determining the remote procedure includes determining a service class of the request identifier used to group one or more procedures into a logical family of one or more procedures.

24. The method of claim 21 wherein determining the remote procedure includes determining a procedure name of the request identifier.

25. The method of claim 21 wherein determining the remote procedure includes determining an identifier of the application, a namespace, and a service class.

26. The method of claim 19 wherein receiving the CBM-RPC request includes receiving a procedure identification and parameters.

27. The method of claim 26 wherein the parameters include name and value pairs.

28. The method of claim 19 wherein receiving the return value includes receiving information requested by the subscriber application.

29. The method of claim 19 wherein receiving the return value includes receiving a fault if the CBM-RPC request is not valid.

30. The method of claim 19 wherein receiving the request identifier includes receiving a namespace to distinguish between procedures that have the same name.

31. The method of claim 19 wherein receiving the request identifier includes receiving a service class used to group one or more procedures into a logical family of one or more procedures.

32. The method of claim 19 wherein receiving the request identifier includes receiving a procedure name.

33. The method of claim 19 wherein receiving the request identifier includes receiving an identifier of the application, a namespace, and a service class.

34. The method of claim 19 wherein receiving the return value includes receiving information based on data accessed from a remote database wherein the remote procedure is configured to access the remote database.

35. The method of claim 34 wherein receiving the return value from the remote procedure includes receiving the return value from a state access function that accesses learner information stored in the remote database.

36. The method of claim 19 wherein receiving the request identifier includes receiving an identification number that distinguishes the CBM-RPC request from other CBM-RPC requests published by the subscriber application application and matches the CBM-RPC request to its corresponding return value.

* * * * *